(12) United States Patent
Lee et al.

(10) Patent No.: US 10,890,778 B2
(45) Date of Patent: Jan. 12, 2021

(54) OPTICAL SYSTEM HAVING AN IMPROVED SIGNAL-TO-NOISE RATIO OF EYE-TRACKING

(71) Applicant: Facebook Technologies, LLC, Menlo Park, CA (US)

(72) Inventors: Yun-Han Lee, Menlo Park, CA (US); Mengfei Wang, Menlo Park, CA (US); Junren Wang, Menlo Park, CA (US); Lu Lu, Menlo Park, CA (US); Robin Sharma, Menlo Park, CA (US); Gregory Olegovic Andreev, Menlo Park, CA (US); Garam Young, Menlo Park, CA (US); Andrew John Ouderkirk, Menlo Park, CA (US); Babak Amirsolaimani, Menlo Park, CA (US); Fenglin Peng, Menlo Park, PA (US); Barry David Silverstein, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/437,902

(22) Filed: Jun. 11, 2019

(65) Prior Publication Data

US 2020/0393690 A1    Dec. 17, 2020

(51) Int. Cl.

| | |
|---|---|
| *H04N 7/18* | (2006.01) |
| *G02B 27/28* | (2006.01) |
| *G02B 5/32* | (2006.01) |
| *G06F 3/01* | (2006.01) |
| *H04N 5/225* | (2006.01) |
| *G02B 5/18* | (2006.01) |

(52) U.S. Cl.
CPC ......... *G02B 27/288* (2013.01); *G02B 5/1814* (2013.01); *G02B 5/32* (2013.01); *G06F 3/013* (2013.01); *H04N 5/2256* (2013.01); *G02B 2005/1804* (2013.01)

(58) Field of Classification Search
CPC .................................................... G02B 27/288
USPC ........................................................... 348/58
See application file for complete search history.

(56) References Cited

U.S. PATENT DOCUMENTS

| | | | | | |
|---|---|---|---|---|---|
| 5,272,550 | A | * | 12/1993 | Dickson | G02B 5/3025 359/15 |
| 5,418,380 | A | * | 5/1995 | Simon | G02B 27/288 250/550 |
| 6,115,152 | A | * | 9/2000 | Popovich | G02B 5/32 353/30 |
| 6,363,180 | B1 | * | 3/2002 | Yamate | G01D 5/344 356/35.5 |
| 6,495,833 | B1 | * | 12/2002 | Alfano | G01N 21/4795 250/330 |
| 6,614,408 | B1 | * | 9/2003 | Mann | H04N 5/23293 345/7 |

(Continued)

*Primary Examiner* — Leron Beck
(74) *Attorney, Agent, or Firm* — Millburn IP PLLC

(57) ABSTRACT

An optical system includes a grating including at least one substrate and a grating structure coupled to the at least one substrate. The grating structure is configured to diffract a first light having an incidence angle within a predetermined range. The optical system also includes a polarizer configured to transmit the first light diffracted by the grating structure and block a second light reflected by a surface of the at least one substrate.

19 Claims, 10 Drawing Sheets

(56) References Cited

U.S. PATENT DOCUMENTS

| | | | |
|---|---|---|---|
| 6,882,358 B1* | 4/2005 | Schuster | H04N 7/144 |
| | | | 348/14.07 |
| 2002/0118456 A1* | 8/2002 | Hasman | B23K 26/0643 |
| | | | 359/484.04 |
| 2003/0067645 A1* | 4/2003 | Ibsen | G01J 3/02 |
| | | | 398/79 |
| 2003/0133657 A1* | 7/2003 | Kochergin | G01N 21/1717 |
| | | | 385/37 |
| 2004/0257663 A1* | 12/2004 | Edelmann | G02B 5/1814 |
| | | | 359/631 |
| 2007/0291339 A1* | 12/2007 | Kumasawa | G03H 1/0011 |
| | | | 359/2 |
| 2008/0266662 A1* | 10/2008 | Perkins | G02B 5/1814 |
| | | | 359/485.05 |
| 2011/0133624 A1* | 6/2011 | Wakabayashi | H01L 51/5262 |
| | | | 313/112 |
| 2012/0218481 A1* | 8/2012 | Popovich | G02B 5/1842 |
| | | | 349/11 |
| 2013/0222384 A1* | 8/2013 | Futterer | H04N 13/344 |
| | | | 345/426 |
| 2015/0035936 A1* | 2/2015 | Robinson | H04N 7/144 |
| | | | 348/14.08 |
| 2017/0003494 A1* | 1/2017 | Kosugi | G02B 23/2415 |
| 2018/0052276 A1* | 2/2018 | Klienman | G09G 3/2044 |
| 2018/0335629 A1* | 11/2018 | Cheng | G09G 3/24 |

* cited by examiner

OPTICAL SYSTEM HAVING AN IMPROVED SIGNAL-TO-NOISE RATIO OF EYE-TRACKING

BACKGROUND

Head-Mounted Display (HMD) has been widely used in, e.g., video playback, gaming, and sports. HMDs have been used to realize virtual reality (VR), augmented reality (AR) or mixed reality (MR). Some VR, AR or MR applications require an eye tracking function that monitors the eye of the user and/or the region surrounding the eye of the user. By monitoring the eye and/or the surrounding region, the HMD can determine a gaze direction of the user, which can be used for improving display quality, performance, and/or user experience, and can be used to address vergence/accommodation conflict. Further, by monitoring the eye and/or the surrounding region, the HMD can estimate the psychological state and/or changes in the psychological state of the user, as well as physical characteristics of the user. The above information can be used by the HMD to, e.g., determine what content to provide to the user. For example, if the user is concentrating on a particular task or activity, the HMD may determine that the user prefers not to be interrupted with other information unless such information would be important to the user. Various eye-tracking techniques have been used in HMDs. However, surface reflection at various optical elements used for eye-tracking often introduces noise to an eye-tracking signal, reducing the signal-to-noise ratio of the eye-tracking signal and degrading the accuracy of the eye-tracking.

BRIEF SUMMARY OF THE DISCLOSURE

One aspect of the present disclosure provides an optical device. The optical device includes an optical system. The optical system includes a grating including at least one substrate and a grating structure coupled to the at least one substrate. The grating structure is configured to diffract a first light having an incidence angle within a predetermined range. The optical system also includes a polarizer configured to transmit the first light diffracted by the grating structure and block a second light reflected by a surface of the at least one substrate Another aspect of the present disclosure provides an eye-tracking system. The eye-tracking system includes a light source configured to emit a light to illuminate an eye of a user. The eye-tracking system also includes a grating disposed facing the eye and configured to receive the light reflected by the eye. The grating includes at least one substrate and a grating structure coupled to the at least one substrate. The grating structure is configured to diffract a first light of the light having an incidence angle within a predetermined range. The eye-tracking system also includes a polarizer disposed facing the grating and configured to transmit the first light diffracted by the grating structure and block a second light of the light reflected by a surface of the at least one substrate. The eye-tracking system further includes an optical sensor disposed downstream of the polarizer in optical series and configured to receive the first light transmitted through the polarizer and generate an image of the eye based on the received first light.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

DETAILED DESCRIPTION

Figure 1:
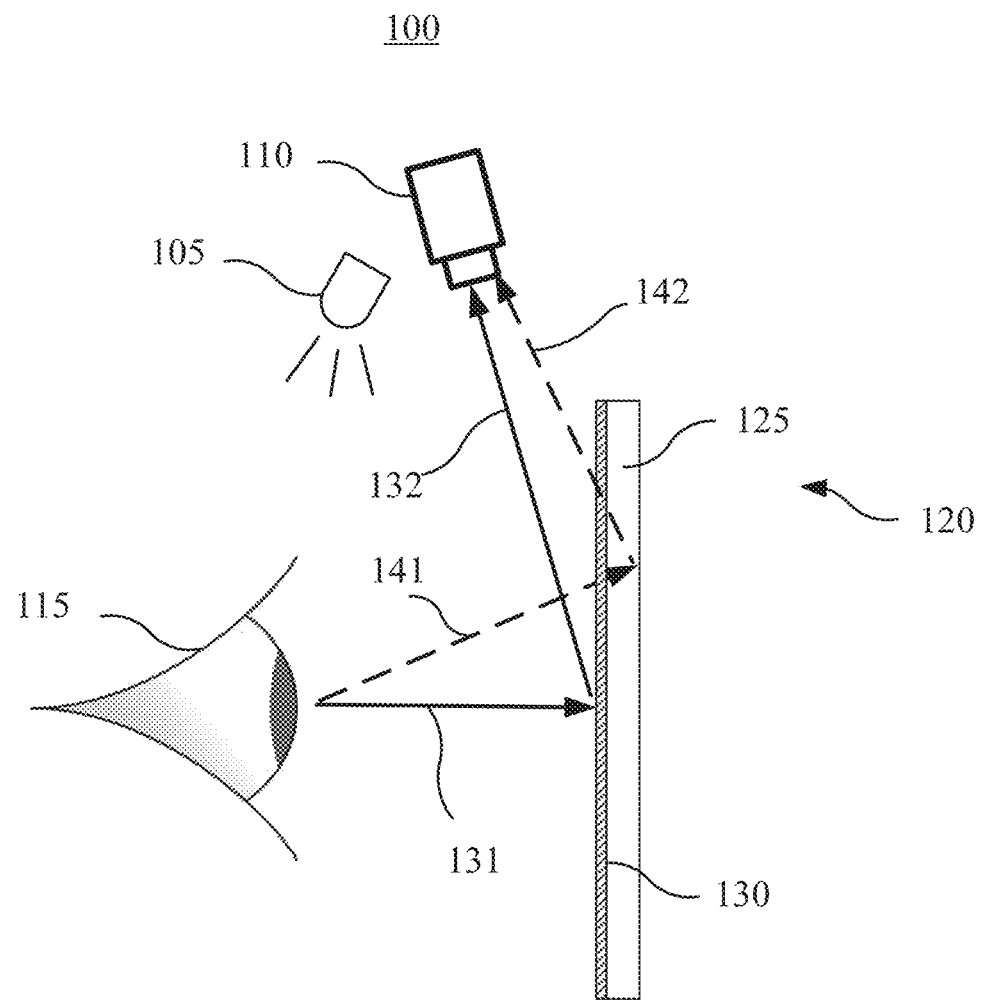
FIG. 1 illustrates an optical system for eye-tracking in a head-mounted display ("HMD")

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Various eye-tracking techniques have been used in HMDs. For example, an infrared light source may emit an infrared light to illuminate one or two eyes of a user of the HMD. The infrared light is not visible to the human eye and thus, does not distract the user wearing the HMD during operation. An optical sensor, such as a camera, may be arranged to receive the infrared light that is reflected by the eye and generate an image of the eye based on the received infrared light. The image of the eye may be used to extract desired information (e.g., gaze direction, movement direction, psychological state, etc.) of the eye. In conventional technologies, an eye-tracking optical element such as a grating may be arranged facing the eye and the optical sensor, infrared light reflected by the eye may be diffracted by the grating towards the optical sensor.

However, when the infrared light reflected by the eye is incident onto the grating at an oblique angle, surface reflection may occur at a substrate surface of the grating. Some of the surface reflection may be received by the optical sensor (e.g., camera) and some may be out of the receiving area or coverage area of the optical sensor. The surface reflection received by the optical sensor may introduce noise to an eye-tracking signal generated based on the infrared light propagating in a signal path, where the infrared light reflected by the eyes is substantially normally incident onto the grating with zero or negligible surface reflection. For example, the optical sensor may generate a bright main image of the eye superimposed with a darkened ghost image. That is, the signal-to-noise ratio of an eye-tracking signal may be reduced. The surface reflection noise light, if not processed, may reduce the quality of the main image of the eye. As a result, the eye-tracking accuracy may be degraded.

In view of the surface reflection, the present disclosure provides an optical system with an improved signal-to-noise ratio of a target tracking. The optical system may be used for eye-tracking in HMDs for AR, VR or MR applications. The optical system may include a surface reflection noise reduction mechanism, which is configured to significantly reduce or eliminate surface reflection noise light in the light received by an optical sensor. For example, when the optical system is used for eye-tracking, the optical system may reduce noise signals in a captured image of the eye, thereby improving the signal-to-noise ratio and enhancing the accuracy of the eye-tracking.

In some embodiments, the optical system may include at least one substrate, a grating structure coupled to the at least one substrate, an optical sensor, and a polarizer disposed in front of the optical sensor in optical series. The grating structure may be configured to guide a light reflected by an eye of a user towards the optical sensor. In some embodiments, the optical system may further include a light source configured to illuminate the eye of the user. Light reflected at a surface of the at least one substrate (referred to as surface reflection) and guided by the grating structure towards the optical sensor is a noise light. Light substantially normally incident onto the grating structure and diffracted by the grating structure towards the optical sensor is a signal light. The signal light and the noise light may be configured to have different polarization. The polarizer disposed in front of the optical sensor may be configured to block the noise light but transmit the signal light. For example, the noise light may be configured to be substantially s-polarized, the signal light may be configured to be p-polarized or unpolarized, and the polarizer may be configured to block the s-polarized light and transmit the p-polarized light or the p-polarized portion of the unpolarized light. Thus, the optical sensor may receive only the signal light that is transmitted through the polarizer, and generate an image of the eye based on the signal light. The disclosed optical system may improve the signal-to-noise ratio of the eye-tracking and, accordingly, enhance the accuracy and quality of the eye-tracking.

FIG. 1 illustrates an optical system 100 implemented in an HMD. The optical system 100 may generate images by utilizing light emitted or reflected by a target being tracked, such as the user's eye. For discussion purpose, such an optical system 100 is referred to as an eye-tracking system in the following descriptions. It is understood that the optical system 100 may be used to track a target other than an eye of a user. In some embodiments, the eye-tracking system 100 may include a light source 105 configured to emit a light to illuminate one or two eyes 115 of a user. The light source 105 may be positioned out of a line of sight of the user and below the eye 115. FIG. 1 shows one eye 115 for illustrative purposes. It is understood that components for tracking the eye 115 may be replicated for tracking the other eye of the user, which are omitted in FIG. 1.

In some embodiments, the light emitted by the light source 105 may include a narrow spectrum or a relatively broad spectrum, and one or more wavelengths of the light may be in the infrared ("IR") spectrum, i.e., the spectrum of the light source 105 may be within, overlap, or encompass the IR spectrum. In some embodiments, the light source 105 may emit light in the near infrared ("NIR") band (about 750 nm to 1250 nm), or some other portion of the electromagnetic spectrum. NIR spectrum light may be advantageous in some embodiments because the NIR spectrum light is not visible to the human eye and thus, does not distract the user wearing the NED during operation. The infrared light may be reflected by a pupil area, of the eye 115, the entire eye 115 of the user, an area near, such as above, below, left to, or right to, the eye 115 of the user, or an area including the eye 115 and the area near the eye 115.

The eye-tracking system 100 may include a grating 120 configured to guide the light reflected by the eye 115 towards an optical sensor 110. The optical sensor 110 may be arranged facing the grating 120, and configured to receive the light guided by the grating 120 and generate a signal for eye-tracking, such as an image of the eye 115 based on the received light. The optical sensor 110 may be sensible to light having a wavelength within a spectrum that includes IR spectrum. In some embodiments, the optical sensor 110 may be sensible to IR light but not visible light. In some embodiments, the optical sensor 110 may include a camera, such as a charge-coupled device ("CCD") camera, a complementary metal-oxide-semiconductor ("CMOS") sensor, an N-type metal-oxide-semiconductor ("NMOS") sensor, a pixelated camera, or any other suitable cameras.

Further, the optical sensor 110 may include a processor configured to process the infrared light, to generate an image of the eye 115, and/or to analyze the image of the eye 115 to obtain information that may be used for eye-tracking and other subsequent operations, such as for determining what information to present to the user or the layout of the presentation of the information, etc. In some embodiments, the optical sensor 110 may also include a non-transitory computer-readable storage medium (e.g., a computer-readable memory) configured to store data, such as the generated images. In some embodiments, the non-transitory computer-readable storage medium may store codes or instructions that may be executable by the processor to perform various steps of any method disclosed herein. In some embodiments, the processor and the non-transitory computer-readable medium may be provided separately from the optical sensor 110. For example, the eye-tracking system 100 may include a controller communicatively connected with the optical sensor 110 and configured to receive data from the optical sensor 110. The controller may be configured to analyze the data (e.g., images of the eye 115) received from the optical sensor 110 to obtain information for eye-tracking or other purposes.

In some embodiments, the grating 120 may include at least one substrate 125 and a layer of grating structures 130 formed on the at least one substrate 125. The substrate 125 may provide support and protection to the grating structures 130. In some embodiments, the substrate 125 may include a lens or an optical waveguide made of a suitable material, such as glass, plastics, etc. The substrate 125 may be rigid or flexible. In some embodiments, the substrate 125 may also be a part of another optical device or another optoelectrical device. For example, the substrate 125 may be a part of a functional device, such as a display screen. In some embodiments, the grating structures 130 may be formed on or bonded to a surface of the substrate 125. In some embodiments, the grating structures 130 may direct contact the surface of the at least one substrate 125. In some embodiments, the grating structures 130 may be spaced apart from the substrate 125 by a spacing material. In some embodiments, additional layer(s), such as protection layer(s) and/or buffer layer(s), can be arranged between the substrate 125 and the grating structures 130.

The grating structures 130 may include any suitable grating structure. In some embodiments, the grating 120 may include a holographic optical element ("HOE"). In some embodiments, the grating 120 may include a polarization selective/sensitive grating, such as a polarization volume hologram ("PVH") grating. In some embodiments, the grating 120 may include a non-polarization selective/sensitive grating, such as a volume Bragg grating ("VBG"). In some embodiments, the grating structures 130 and the substrate 125 may be made of the same material, and the grating structures 130 and the substrate 125 may be a single component, rather than being separate components. For example, the grating 120 may be a VBG where the substrate 125 is a glass block and the grating structures 130 are integrally formed within the glass block. In some embodiments, the grating structures 130 and the substrate 125 may be made of different materials. For example, the grating 120 may be a PVH grating where the grating structures 130 is formed by liquid crystals ("LCs") and the substrate 125 is made of glass, i.e., the PVH grating includes an LC layer having a grating function formed on the substrate.

As shown in FIG. 1, the grating 120 may be configured to guide (e.g., transmit, reflect, and/or diffract) the light reflected by the eye 115 (referred to as reflected light in the following) into the optical sensor 110. The reflected light may be incident onto the grating 120 with various incidence angles, such as 0 degree (i.e., perpendicular to the surface of the grating 120), 30 degrees, 45 degrees, 60 degrees, 70 degrees, etc. A reflected light 131 that is substantially normally incident onto the grating 120 may be diffracted by the grating structures 130 to a diffracted light 132. The optical sensor 110 may be positioned to receive the diffracted light 132, and generate an image of the eye 115 based on the diffracted light 132. Such diffracted light 132 may be referred to as a signal light or an eye-tracking signal. A reflected light 141 having an oblique incidence angle may not be diffracted by the grating structures 130 but may be reflected by a surface of the substrate 125 as a surface reflected light 142. In other words, there may be surface reflection at the surface of the substrate 125. Because the optical sensor 110 is arranged to have a specific receiving area, in addition to the signal light 132, the optical sensor 110 may also receive the surface reflected light 142, which may introduce noise to the eye-tracking signal. Such surface reflected light 142 received by the optical sensor 110 may be referred to as a noise light or a noise. Thus, the optical sensor 110 may receive both the signal light 132 and the noise light 142. The noise light 142 caused by the surface reflection at the substrate 125 of the grating 120 may adversely affect the quality of the image of the eye generated by the optical sensor 110 based on the signal light 132. Therefore, the accuracy of the eye-tracking may be degraded by the noise light 142.

Figure 2:
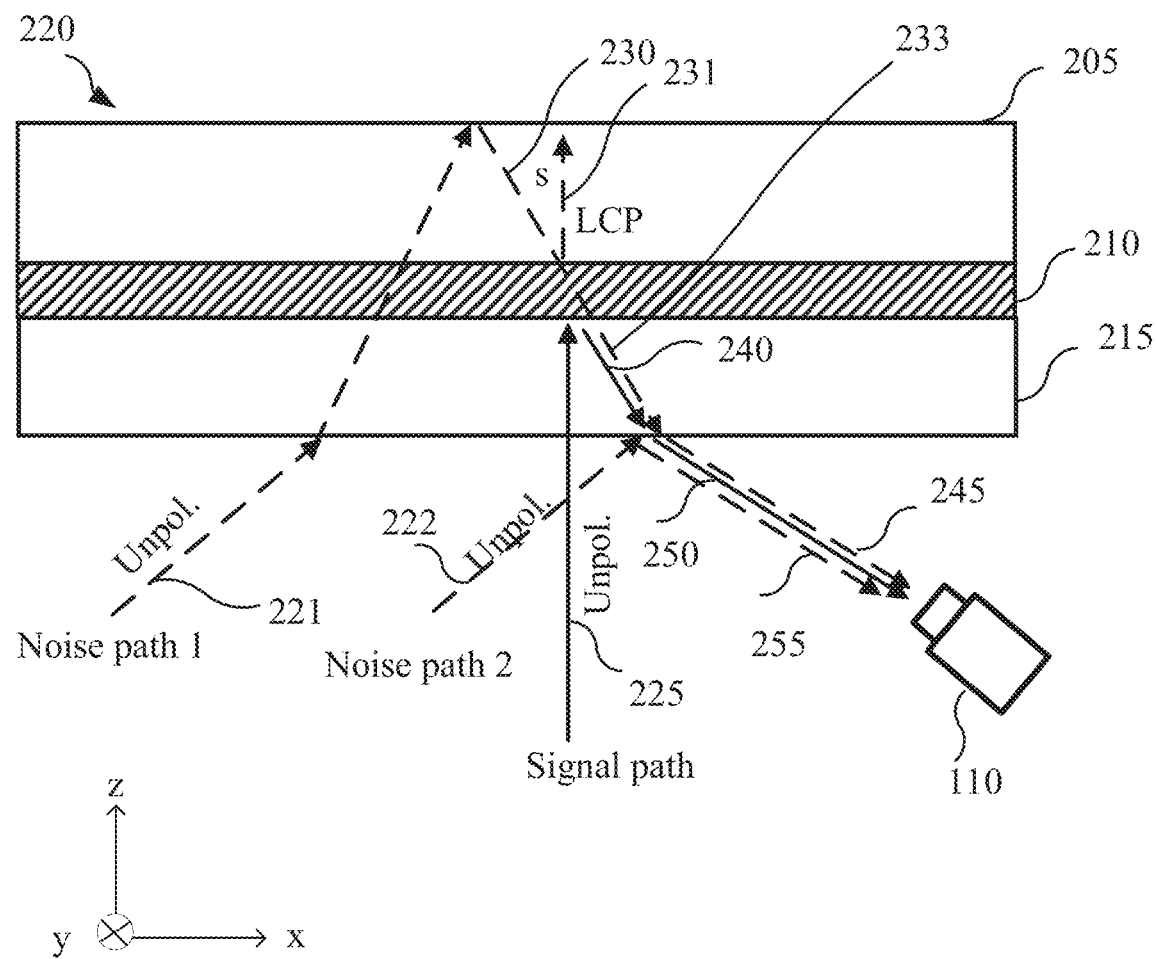
FIG. 2 illustrates an eye-tracking system to demonstrate an effect of surface reflection.

FIG. 2 illustrates an eye-tracking system 200 to demonstrate an effect of surface reflection. The eye-tracking system 200 may be similar to the eye-tracking system 100, except that a grating 220 of the eye-tracking system 200 may include two substrates, a first substrate 205 and a second substrate 215 for supporting and protecting purposes. It is noted that in some embodiments, one of the two substrates may be omitted. That is, the eye-tracking system 200 may include only one substrate, as in the eye-tracking system 100. Each of the first substrate 205 and the second substrate 215 may be similar to the substrate 125 shown in FIG. 1.

The grating 220 may include a layer of grating structures 210 disposed between the first substrate 205 and the second substrate 215. The grating structures 210 may be any suitable grating structures. In some embodiments, the grating structures 210 may be in a form of a PVH layer (hence the grating structures 210 may also be referred to as a PVH layer 210 for illustrative purposes), and the grating 220 may be a PVH grating accordingly. The PVH layer 210 may include a plurality of LC molecules spatially orientated to realize an optical function of the PVH layer 210. The PVH layer 210 may be configured to diffract a light via Bragg diffraction. The Bragg grating in the PVH layer 210 may be generated by adding a chiral dopant to the LCs to induce a helical twist along a light prorogation direction. The helix twist may be either left-handed or right-handed and, accordingly, the PVH layer 210 may be referred to as a left-handed or a right-handed PVH layer. In some embodiments, the PVH layer 210 may diffract circularly polarized light having a same handedness as the helix twist of the PVH layer 210 and transmit circularly polarized light having an orthogonal handedness. That is, a left-handed PVH layer may diffract a left-handed circularly polarized ("LCP") light and transmit a right-handed circularly polarized ("RCP") light, while a right-handed PVH layer may diffract an RCP light and transmit an LCP light.

The angle between the incident light and the diffracted light may depend on the wavelength of the incident light and the Bragg period of the Bragg grating in the PVH layer 210. In some embodiments, depending on the alignment of the LC molecules in the PVH layer, the PVH layer may further converge or diverge the incident light. The PVH layer 210 may be also referred to as, e.g., a "polarization sensitive grating," a "polarization sensitive optical element," a "liquid crystal grating," or a "chiral liquid crystal element." Although the grating 220 is shown as including flat surfaces, it is understood that in some embodiments, the grating 220 may have a curved surface. For example, the substrates 205 and 215 and the PVH layer 210 may each have a curved surface. The detailed structure of a PVH grating will be described in FIGS. 8A-8C.

For simplicity, the light source 105 and the eye 115 shown in FIG. 1 (which may both be located on the same side as the optical sensor 110 in FIG. 2) are not shown in FIG. 2. In some embodiments, at least one wavelength in the spectrum of the light source 105 may correspond to the Bragg period of the Bragg grating formed by the LC molecules in the PVH layer 210. In some embodiments, the light emitted by the light source 105 may have a wavelength in the IR spectrum and corresponding to the Bragg period of the Bragg grating in the PVH layer 210. The wavelength of the light may be, e.g., from about 800 nm to about 1600 nm, such as about 850 nm, about 940 nm, or about 930 nm. The Bragg period of the Bragg grating in the PVH layer 210 may be, e.g., from about 200 nm to about 350 nm, or centered at about 288 nm or about 320 nm.

The light from the light source may be reflected by the eye 115 (shown in FIG. 1) and incident onto the grating 220 at different incidence angles. The PVH layer 210 may be configured to diffract the reflected light incident onto the PVH layer 210 via Bragg diffraction when an incidence angle is within a first predetermined range, i.e., when a Bragg condition is satisfied, and transmit the reflected light having an incidence angle outside of the first predetermined range as the Bragg condition is not satisfied. In some embodiments, the first predetermined range may be approximately from 0° to 60° in air, including 0° and 60°. In some embodiments, the substrate 215 may be a glass having a refractive index of 1.5, then the first predetermined range may be approximately from 0° to 35° in the glass, including 0° and 35°. For illustrative purposes, FIG. 2 shows a "Signal path" in which an unpolarized signal light 225 is substantially normally incident onto the grating 220 (i.e., at a substantially 0° incidence angle). Because the signal light 225 is incident substantially perpendicular to the surface of the substrates 205 and 215, the surface reflection (Fresnel reflectance) at the substrates 205 and 215 of the grating 220 may be substantially zero.

On the other hand, the reflected light, which is incident onto the PVH layer 210 at an incidence angle outside of the first predetermined range, may not be diffracted by the PVH layer 210 but may be reflected at the surfaces of the substrates 205 and 215. The grating 220 may guide the surface reflected light (i.e., noise light) towards the optical sensor 110. However, not all the surface reflected light guided by the grating 220 towards the optical sensor 110 may be received by the optical sensor 110, because the optical sensor 110 has a specific receiving area. In some embodiments, only the surface reflected light that is incident onto the grating 120 at an incidence angle within a second predetermined range may be received by the optical sensor 110, while the surface reflected light that is incident onto the grating 210 at an incidence angle outside of the second predetermined range may not be received by the optical sensor 110. The surface reflected light that is received by the optical sensor 110 may be referred to as a surface reflection noise light. For illustrative purposes, FIG. 2 shows two noise paths, "Noise path 1" and "Noise path 2." In the noise paths, unpolarized lights 221 and 222 may be incident onto the grating 220 at an incidence angle within the second predetermined range, and may be respectively reflected at a surface of the first substrate 205 and a surface of the second substrate 215 towards the optical sensor 110 and received by the optical sensor 110.

Figure 3:
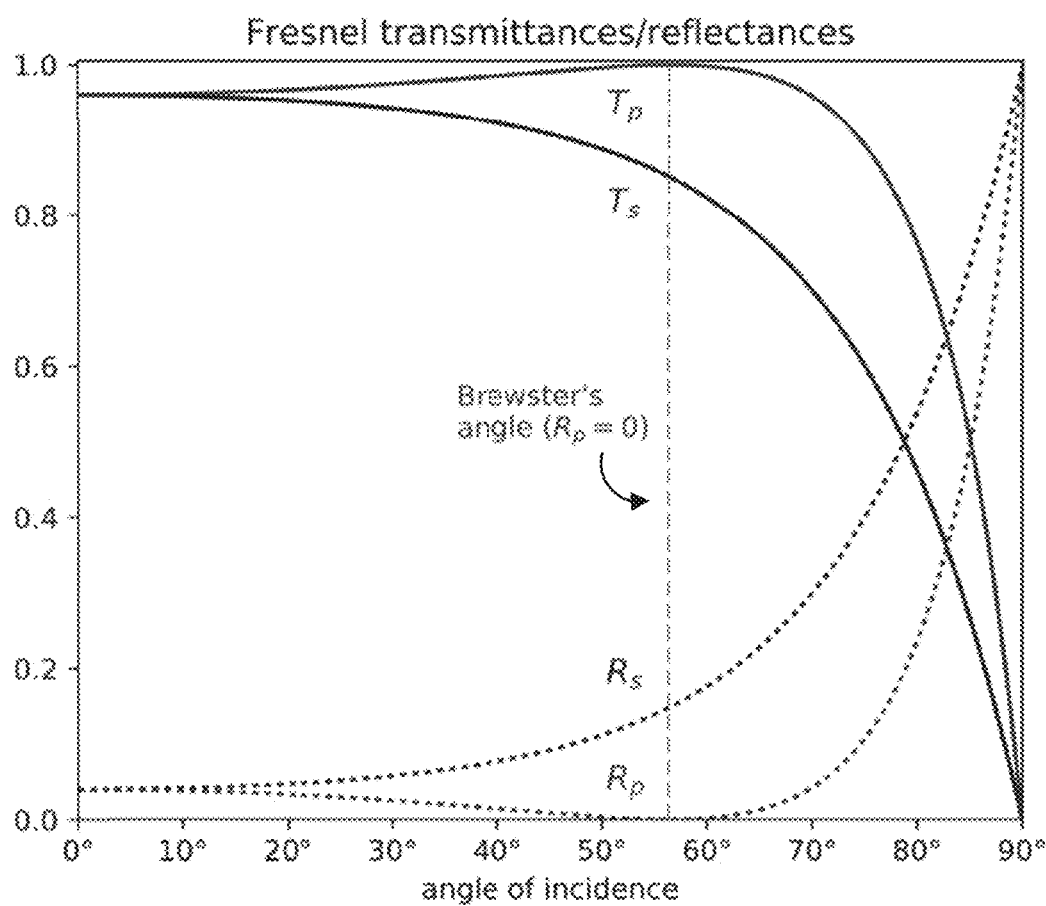
FIG. 3 shows a plot of Fresnel transmittance and reflectance versus incidence angle at an air-glass interface.

When the first substrate 205 and the second substrate 215 are glass having refractive index of 1.5, the inventors found that the second predetermined range is about 45° to 75° in air. That is, the surface reflection of the light that is incident onto the grating 220 within 45° to 75° of incidence angle may be received by the optical sensor 110, while the surface reflection of the light that is incident onto the grating 210 outside of the 45° to 75° range of incidence angle may not be received by the optical sensor 110. The inventors also found that when the light is incident onto the grating 220 at an incidence angle within the second predetermined range of 45° to 75° in air, the surface reflected light may be substantially s-polarized. FIG. 3 shows a plot of Fresnel transmittance (Ts and Tp) and reflectance (Rs and Rp) versus the incidence angle at an air-glass interface. Ts and Tp represent the Fresnel transmittance for s-polarized light and p-polarized light, respectively. Rs and Rp represent the Fresnel reflectance for the s-polarized light and the p-polarized light, respectively. As shown in FIG. 3, due to the position and receiving area of the optical sensor 110, the surface reflected light that can be received by the optical sensor 110 was found to be the surface reflection of the light that has an incidence angle in a range of 45° to 75° in air. In addition, within such an incidence angle range, the surface reflected light is primarily s-polarized. As indicated by the curves for the Rs and Rp, within such an incidence angle range, the reflectance for p-polarized light Rp is substantially zero, whereas the reflectance for the s-polarized light is about 0.1 to about 0.4.

Returning to FIG. 2, an effect of surface reflection in the grating 220 is explained in the following. In the Noise path 1, the unpolarized light 221 may be incident onto the second substrate 215 at an incidence angle in a range of 45° to 75° in air. The light 221 may propagate through the second substrate 215, the PVH layer 210 without being diffracted (because the PVH layer is designed to diffract light having an incidence angle from 0° to 60° in air), and the first substrate 205, and then reflected by the top surface of the first substrate 205 to become an s-polarized light 230. The s-polarized light 230 may be incident onto the PVH layer 210. The PVH layer 210 may be a left-handed PVH layer that diffracts an LCP light and transmit an RCP light. Thus, an LCP portion of the s-polarized light 230 may be diffracted by the PVH layer 210 to become an LCP light 231 propagating towards the first substrate 205, and an RCP light portion of the s-polarized light may be transmit through the PVH layer 210 to be an RCP light 233 propagating towards the second substrate 215. The RCP light 233 may be refracted at the bottom surface of the second substrate 215 (the surface facing the eye 115 or the optical sensor 110) to become an RCP light 245, which is received by the optical sensor 110. In the Noise path 2, the unpolarized light 222 may be incident onto the second substrate 215 at an incidence angle in a range of 45° to 75° in air. The unpolarized light 222 may be reflected at the bottom surface of the second substrate 215 to become an s-polarized light 255.

In the Signal path, the unpolarized signal light 225 may be substantially normally incident onto the second substrate 215, and diffracted by the PVH layer 210 to become an LCP light 240. For simplicity of illustration and discussion, the RCP portion of the unpolarized signal light 225 that transmits through the PVH layer 210 towards the first substrate 205 is omitted in FIG. 2. The LCP light 240 may be refracted at the bottom surface of the second substrate 215 to become an LCP light 250. The RCP light 245 from the Noise path 1, the s-polarized light 255 from the Noise path 2, and the LCP light 250 from the signal path may all be received by the optical sensor 110, based on which an image of the eye 115 may be generated. The s-polarized light 255 and the RCP light 245 may be the surface reflection noise light, which may reduce the signal-to-noise ratio of the eye-tracking signal 250. As a result, the accuracy of the eye-tracking may be degraded.

Figure 4:
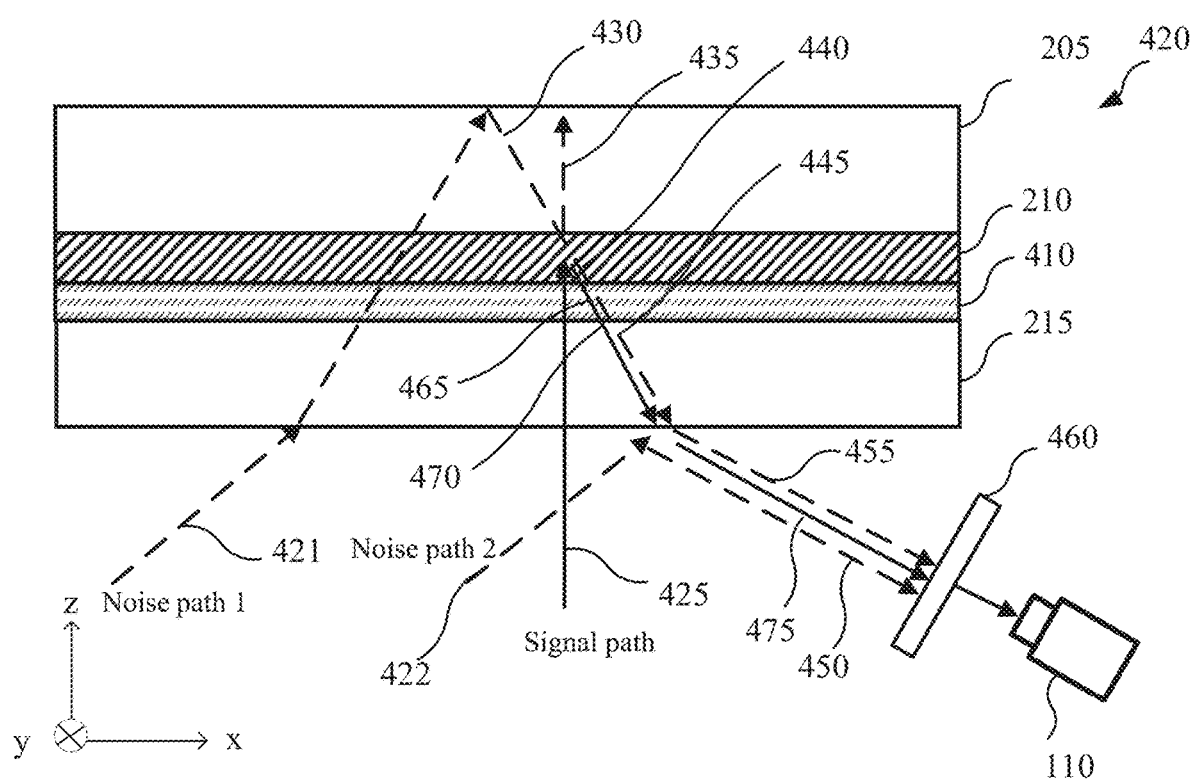
FIG. 4 illustrates an eye-tracking system having a surface reflection noise reduction mechanism, according to an embodiment of the disclosure.

FIG. 4 illustrates an eye-tracking system 400 with a surface reflection noise reduction mechanism, according to an embodiment of the present disclosure. The eye-tracking system 400 includes elements similar to those included in the eye-tracking systems 100 and 200 shown in FIG. 1 and FIG. 2. The descriptions of the similar or the same elements are omitted. As shown in FIG. 4, compared to the eye-tracking system 200 shown in FIG. 2, the eye-tracking system 400 may further include a waveplate 410 and a polarizer 460 in addition to a grating 420. The PVH layer 210 of the grating 420 has a first side facing the eye 115 (or the optical sensor 110) and an opposing second side, and the waveplate 410 may be disposed at the first side of the PVH layer 210. For illustrative purposes, FIG. 4 shows the waveplate 410 disposed between the PVH layer 210 and the second substrate 215. That is, the second substrate 215 has a first side facing the eye 115 (or the optical sensor 110) and an opposing second side, and the waveplate 410 may be disposed at the second side of the second substrate 215. In some embodiments, the waveplate 410 may be disposed at the first side of the second substrate 215 facing the optical sensor 110.

In some embodiments, the waveplate 410 may be a quarter-wave plate 410 for the infrared spectrum. The quarter-wave plate 410 may be configured to convert a circularly polarized light to a linearly polarized light and vice versa for an infrared spectrum. In some embodiments, for an achromatic design, the quarter-wave plate 410 may include a plurality of layers of one or more birefringent materials (e.g., polymer or LC materials) to produce quarter wave birefringence across a wide spectra range. In some embodiments, for a monochrome design, an angle between a polarization axis (i.e., fast axis) of the quarter-wave plate 410 and a polarization direction of the incident linearly polarized light may be approximately 45 degrees. As a person having ordinary skills in the art can appreciate, the quarter-wave plate 410 for the infrared spectrum may be a half-wave plate for the visible spectrum. For example, if the infrared wavelength is 900 nm, the quarter-wave plate 410 for 900 nm wavelength in infrared range may be approximately a half-wave plate for 450 nm wavelength in the visible range.

As shown in FIG. 4, in the Noise path 1, an unpolarized light 421 may be incident onto the second substrate 215 at an incidence angle in a range of 45° to 75° in air. After being transmitted through the second substrate 215, the quarter-wave plate 410, the PVH layer 210 (without being diffracted), and the first substrate 205, the unpolarized noise light 421 may be reflected at a top surface of the first substrate 205 to be an s-polarized light 430, which propagates towards the PVH layer 210. The PVH layer 210 may diffract an LCP portion of the s-polarized light 430 to be an LCP light 435, and transmit an RCP portion of the s-polarized light 430 to be an RCP light 440 towards the quarter-wave plate 410. The quarter-wave plate 410 may convert the RCP light 440 to an s-polarized light 445. The s-polarized light 445 may be refracted at the bottom surface of the second substrate 215 to become an s-polarized light 455.

The polarizer 460 may be disposed in front of the optical sensor 110 in optical series, i.e., upstream of the optical sensor 110 in the optical path. In some embodiments, the polarizer 460 may be disposed between the grating 420 and the optical sensor 110. Optical series refers to relative positioning of a plurality of optical elements, such that light, for each optical element of the plurality of optical elements, is transmitted by that optical element before being transmitted by another optical element of the plurality of optical elements. Moreover, ordering of the optical elements does not matter. For example, optical element A placed before optical element B, or optical element B placed before optical element A, are both in optical series. Similar to electric circuitry design, optical series represents optical elements with their optical properties compounded when placed in series.

The polarizer 460 may be configured to block a light having a first polarization and transmit a light having a second polarization different from the first polarization. In some embodiments, the second polarization may be orthogonal to the first polarization. For example, the polarizer 460 may be configured to block an s-polarized light and transmit a p-polarized light. Therefore, the s-polarized light 455 may be blocked by the polarizer 460, i.e., the optical sensor 110 may not receive the s-polarized light 455.

In the Noise path 2, an unpolarized light 422 may be incident onto the second substrate 215 at an incidence angle in a range of 45° to 75° in air. The unpolarized light 422 may be reflected by the bottom surface of the second substrate 215 to become an s-polarized light 450, which is also blocked by the polarizer 460. Accordingly, the optical sensor 110 may not receive the s-polarized light 450.

In the Signal path, an unpolarized signal light 425 may be substantially normally incident onto the grating 420 (i.e., the incidence angle is about 0 degree). The signal light 425 may propagate through the second substrate 215 and the quarter-wave plate 410, and substantially normally incident onto the PVH layer 210. An LCP portion of the signal light 425 may be diffracted by the PVH layer 210 to become an LCP light 465 propagating towards the quarter-wave plate 410, and an RCP portion of the signal light 425 may be transmit through the PVH layer 210 propagating towards the first substrate 205, which is not shown in FIG. 4 for simplicity. The quarter-wave plate 410 may convert the LCP light 465 to a p-polarized light 470. The p-polarized light 470 may be refracted at the bottom surface of the second substrate 215 to become a p-polarized light 475. Because the polarizer 460 transmits a p-polarized light and blocks an s-polarized light, the p-polarized light 475 may be transmitted through the polarizer 460 and received by the optical sensor 110.

Thus, the optical sensor 110 may be configured to receive only the p-polarized light 475 coming from the Signal path, and not receive the s-polarized light 455 and the s-polarized light 450 coming from the Noise path 1 and Noise path 2, respectively. As a result, the noise in the eye-tracking signal may be reduced or eliminated, thereby improving the accuracy of eye-tracking. For example, when the optical sensor 110 includes a camera, the ghost image in the image of the eye 115 captured by the camera may be reduced or eliminated. In some embodiments, the grating 420 may further include visible antireflection to gain more signal in the IR Fresnel reflection.

Figure 5A:
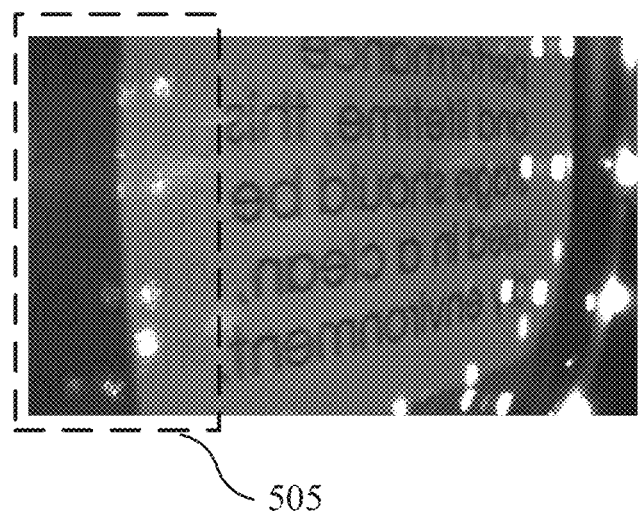
FIG. 5A illustrates an experimental result of the eye-tracking system shown in FIG. 2.
Figure 5B:
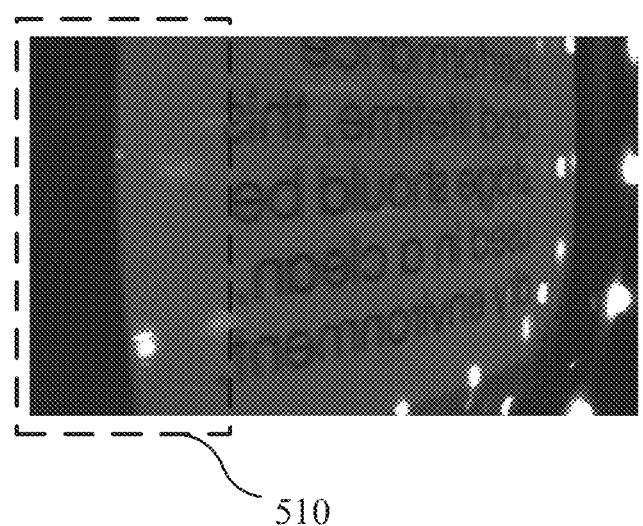
FIG. 5B illustrates an experimental result of the eye-tracking system shown in FIG. 4, according to an embodiment of the disclosure.

FIG. 5A illustrates an experimental result of the conventional eye-tracking system 200 in FIG. 2 that does not include a mechanism to reduce the surface reflection noise. FIG. 5B illustrates an experimental result of the eye-tracking system 400 in FIG. 4 that includes a mechanism to reduce the surface reflection noise. In the experiment, for illustrative purposes, the eye 115 is replaced by a piece of paper with texts. FIG. 5A shows an image captured by the optical sensor 110, which is a camera. As shown in FIG. 5A, noise (ghost image) caused by surface reflection of the grating 210 exists in the area framed by a dashed rectangle 505. As a compassion, as shown in FIG. 5B, the surface reflection noise light (ghost image) is significantly reduced in a dashed rectangle 510. With the reduced surface reflection noise, the accuracy of the eye-tracking may be enhanced.

It should be noted that in FIGS. 2-4, the first predetermined range of the incidence angle at the grating 220 and the grating 420 is about 0° to 60° in air, and the second predetermined range of the incidence angle at the grating 220 and the grating 420 is about 45° to 75° in air, which is for illustrative purposes and is not intended to limit the scope of the present disclosure. The first predetermined range of the incidence angle may be determined according to various factors, such as the wavelength of the incident light, the grating period, and/or the slant angle of the grating structures, etc. The second predetermined range of the incidence angle may be determined according to various factors, such as the refractive indices of the materials of the grating structures and the substrate, the wavelength of the incident light, the grating period, the slant angle of the grating structures, the position of the optical sensor, and/or the receiving area of the optical sensor, etc. The surface noise reduction mechanism provided by the present disclosure is configured such that the surface reflected noise light and the signal light incident onto the polarizer have different polarizations, such that the polarizer 460 disposed in front of the optical sensor 110 in optical series may block the surface reflected noise light having one polarization and transmit the signal light having another different polarization, thereby improving the signal-to-noise ratio of the eye-tracking. In some embodiments, configuring the surface noise reduction mechanism such that the surface reflected noise light and the signal light are received by the optical sensor 110 with different polarizations may be include configuring a position and a receiving area of the optical sensor and configuring the parameters (such as the wavelength of the incident light, the grating period, and/or the slant angle of the grating structures) of the grating 420, such that the surface reflection noise light to be incident onto the polarizer 460 disposed in front of the optical sensor 110 in optical series may be substantially s-polarized.

FIG. 4 shows that the eye-tracking system 400 includes a polarization selective/sensitive grating, e.g., a PVH grating, configured to guide the light reflected by the eye 115 towards the optical sensor 110. In some embodiments, the eye-tracking system 400 may include a non-polarization selective/sensitive grating configured to guide the light reflected by the eye 115 towards the optical sensor 110. An exemplary structure is shown in FIG. 6.

Figure 6:
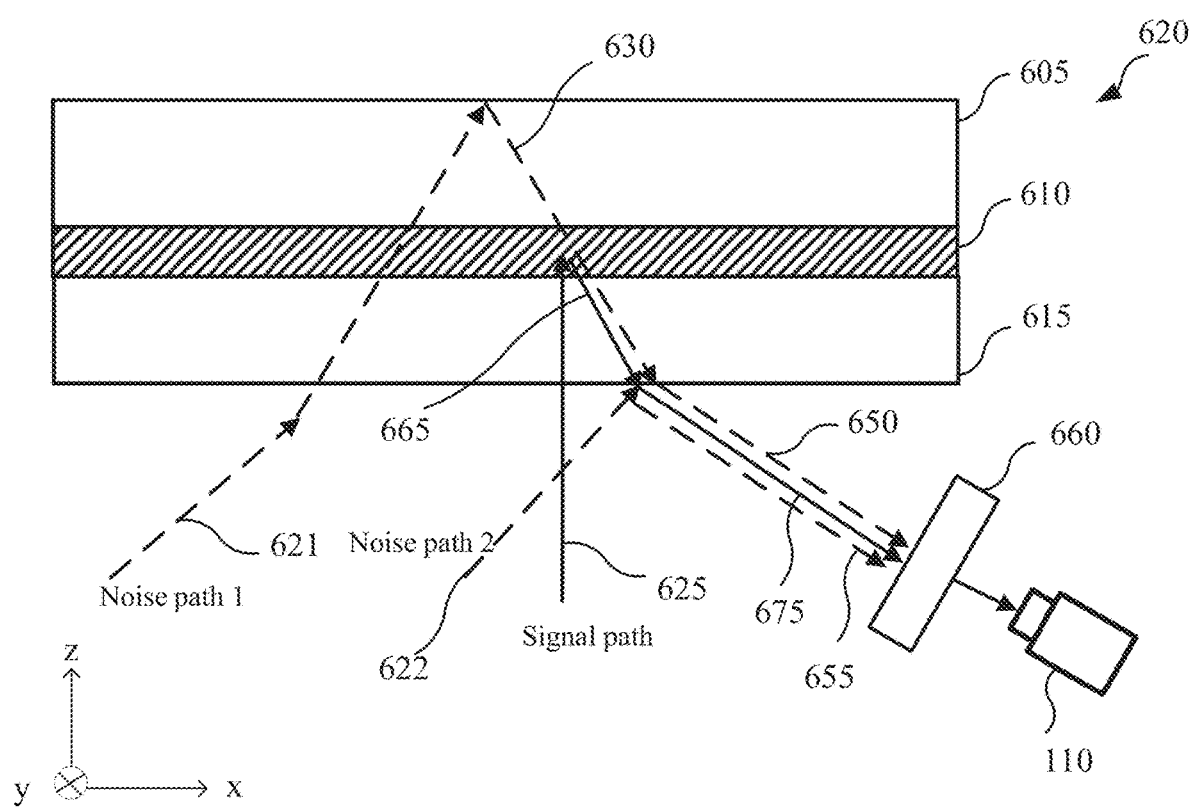
FIG. 6 illustrates a schematic diagram of another eye-tracking system having a surface reflection noise reduction mechanism, according to an embodiment of the disclosure.

FIG. 6 illustrates another eye-tracking system 600 that includes a surface reflection noise reduction mechanism. The similarities between FIG. 6 and FIG. 4 are not repeated here, while certain difference is explained. As shown in FIG. 6, the eye-tracking system 600 may include a grating 620, a polarizer 660, and the optical sensor 110. The grating 620 may guide a light, which is a light emitted from a light source to illuminate an eye 115 and reflected by the eye 115, towards the optical sensor 110. The polarizer 660 may be arranged in front of the optical sensor 110 in optical series. The polarizer 660 may be configured to block an s-polarized light and transmit a p-polarized light. For example, the polarizer 660 may be configured to block a light reflected by a surface of a substrate of the grating 620, which may be substantially s-polarized, and transmit a p-polarized portion of a light diffracted by the grating 620. The optical sensor 110 may be configured to receive the p-polarized portion of the light transmitted through the polarizer 660.

The grating 620 may include a first substrate 605, a second substrate 615, and a holographic optical element ("HOE") 610 disposed between the first substrate 605 and the second substrate 615. In some embodiments, one of the first substrate 605 and the second substrate 615 may be omitted. The substrate 605 and 615 may be similar to the substrates 205 and 215. The HOE 610 may be a non-polarization selective/sensitive element, i.e., a polarization insensitive element. In some embodiments, the HOE 610 may be a volume Bragg grating ("VBG") element (hence the HOE 610 is also referred to as VBG 610, and the grating 620 is also referred to as VBG grating 620).

The VBG 610 may be configured such that only light having an incidence angle within a third predetermined range may be diffracted via Bragg diffraction, and light having an incidence angle outside of the first predetermined range may not be diffracted (e.g., may be transmitted through without diffraction). In some embodiments, the first predetermined range of the incidence angle may be approximately from 0° to 60° in air, including 0° and 60°. In some embodiments, the substrate 615 may be a glass having a refractive index of 1.5, then the first predetermined range may be approximately from 0° to 35° in the glass, including 0° and 35°.

As shown in FIG. 6, in the Noise path 1, an unpolarized light 621 may be incident onto the second substrate 615 at an incidence angle in a range of 45° to 75° in air. The unpolarized light 621 may propagate through the second substrate 615, the VBG 610 (without being diffracted), and may be reflected by a top surface of the first substrate 605. As discussed above in connection with FIG. 3, the reflected light 630 may be an s-polarized light. The s-polarized light 630 may propagate through the first substrate 205, the VBG 610 (without being diffracted), and the second substrate 615, and become an s-polarized light 650. In the Noise path 2, an unpolarized noise light 622 may be incident onto the second substrate 615 at an incidence angle in a range of 45° to 75° in air. The unpolarized noise light 622 may be reflected by a bottom surface of the second substrate 615 and become an s-polarized light 655. In the Signal path, an unpolarized signal light 625 may be substantially normally incident onto the grating 620. The signal light 625 may prorogate through the second substrate 215 and be diffracted by the VBG 610 to become an unpolarized signal light 665. The unpolarized signal light 665 may propagate through the second substrate 615 and become an unpolarized signal light 675.

The polarizer 660 may be configured to block an s-polarized light and pass a p-polarized light. Thus, the s-polarized light 675 and the s-polarized portion of the unpolarized signal light 675 may be blocked, while the p-polarized portion of the unpolarized signal light 675 may be transmitted through the polarizer 660 to be received by the optical sensor 110. When the optical sensor 110 is a camera, the optical sensor 110 may generate an image of the eye 115 based on the p-polarized portion of the unpolarized light 675 for eye-tracking purpose. Thus, the noise caused by the surface reflection at the surface of the substrates of the grating 620 may be suppressed, and the signal-to-noise ratio of the eye-tracking signal may be improved. Accordingly, the accuracy of the eye-tracking may be improved.

Figure 7A:
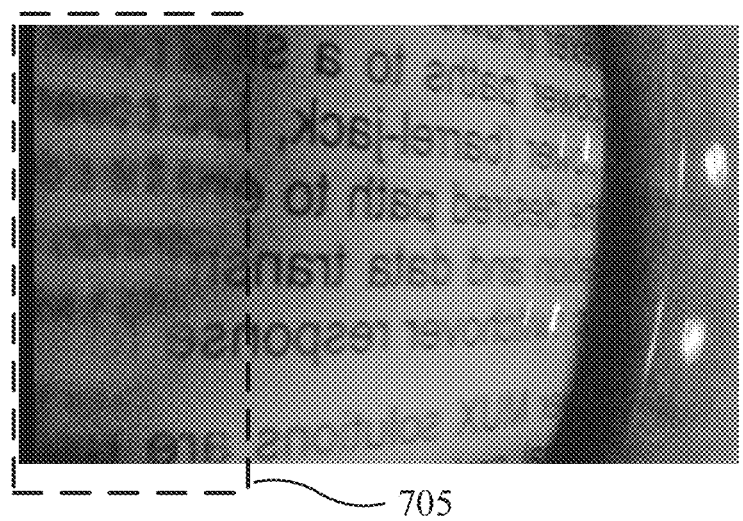
FIG. 7A illustrates an experimental result of an eye-tracking without a surface reflection noise reduction mechanism.
Figure 7B:
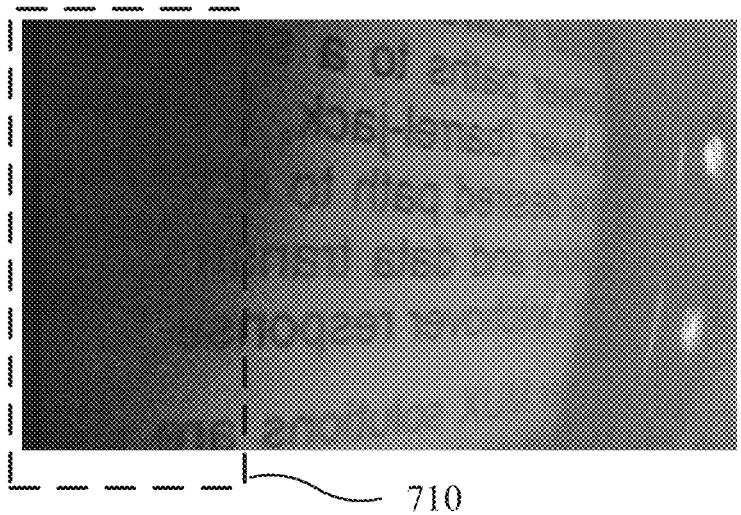
FIG. 7B illustrates an experimental result for the eye-tracking system in FIG. 6 having a surface reflection noise reduction mechanism, according to an embodiment of the disclosure.

FIG. 7A illustrates an image generated by a conventional eye-tracking system without a surface reflection noise reduction mechanism. For example, the conventional eye-tracking system may be similar to the eye-tracking system 600, except that the conventional eye-tracking system may not include the polarizer 660. As shown in a dashed rectangle 705, a ghost image caused by the surface reflection can be observed. FIG. 7B illustrate an image generated by the eye-tracking system 600 that includes the polarizer 660. As shown in FIG. 7B, surface reflection noise (ghost image) is significantly suppressed in the image area indicated by a dashed rectangle 710.

Figure 8A:
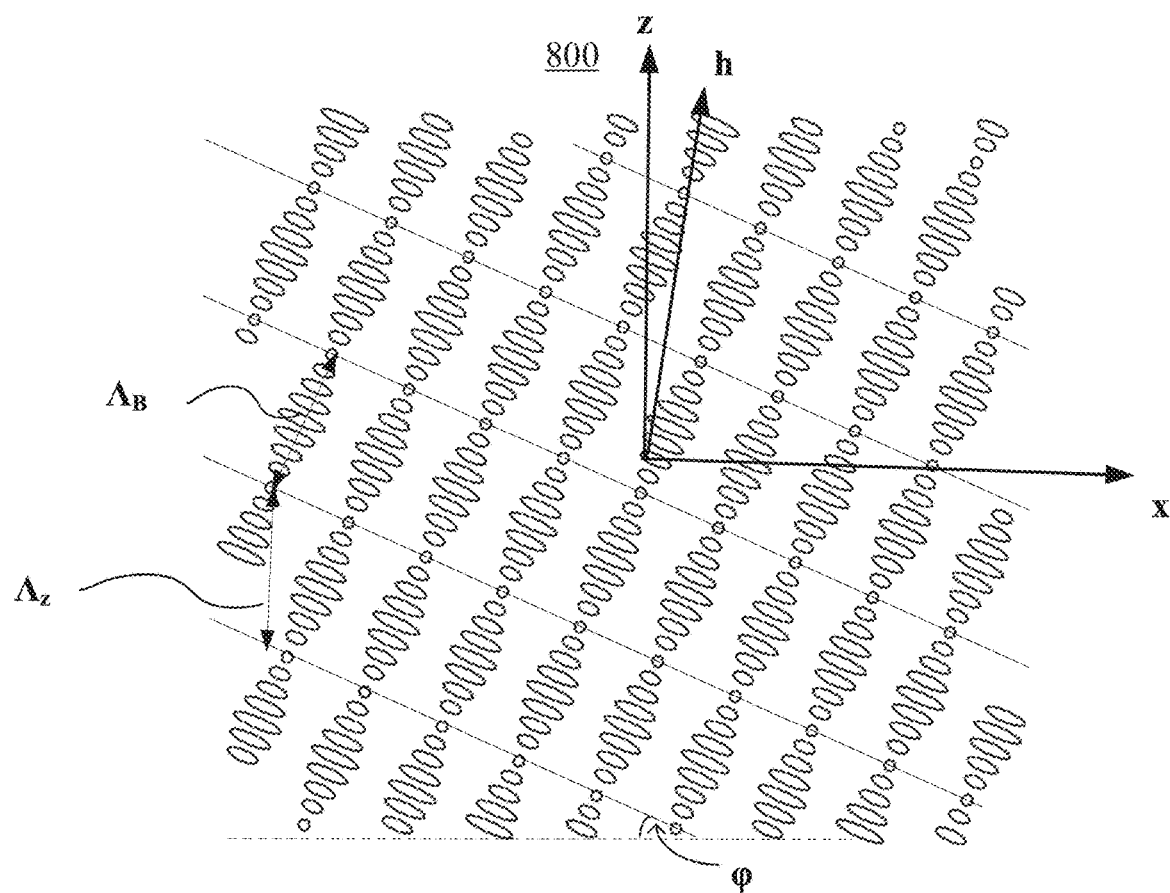
FIG. 8A is a cross-sectional view of a polarization volume hologram ("PVH") layer included in a PVH grating, according to an embodiment of the disclosure.
Figure 8B:
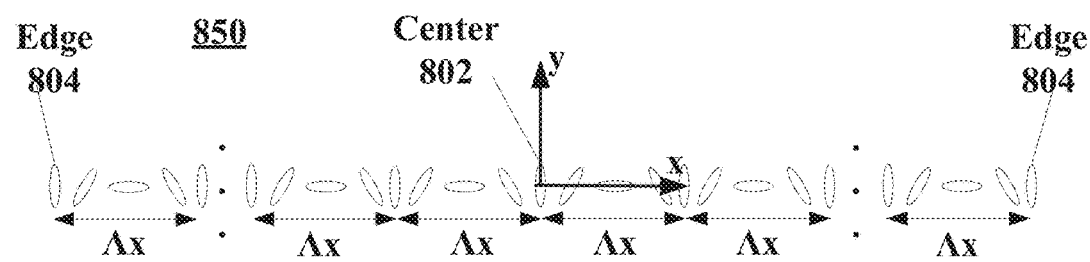
FIG. 8B is a partial plan view of the PVH layer shown in FIG. 8A in the x-y plane, according to an embodiment of the disclosure.

FIGS. 8A-8B schematically show an example PVH layer 800 that may be included in the grating 220 and grating 420, as shown in FIG. 2 and FIG. 4, and the grating 120 shown in FIG. 1. FIG. 8A is a cross-sectional view of the PVH layer 800 in the x-z plane. FIG. 8B is a partial plan view 850 of the PVH layer 800 in the x-y plane along the x-axis from a center region of the PVH layer 800 to an edge region of the PVH layer 800. The optical function of a PVH layer may be determined based on the manipulation of optic axes of the liquid crystal ("LC") molecules in the PVH layer. Hereinafter, an orientation of the optic axis of an LC molecule is also referred to as an orientation or alignment of the LC molecule. The manipulation of optic axes of the LC molecules in the PVH layer is a three-dimensional ("3D") alignment of the LC molecules. A PVH layer consistent with the present disclosure can deflect a light via Bragg diffraction. The Bragg grating in the PVH layer may be created by adding a chiral dopant to induce a helical twist along a certain direction, e.g., an h-axis direction shown in FIG. 8A.

As shown in FIG. 8A, the LC (or more broadly speaking, birefringent material because a reactive mesogen may also be employed) exhibits a helical structure with a period length of $\Lambda_y$ (or one half of the pitch length p) along y-axis. The LC molecules may exhibit uniform molecular rotation with respect to a slanted helical axis, e.g., an h-axis direction. The period $\Lambda_y$ (or pitch length $p=2\Lambda_y$) may be adjusted by controlling the helical twist power ("HTP") and concentration of the chiral dopant. Further, as shown in FIG. 8B, an in-plane periodicity in the x-y plane is also introduced into the PVH layer 800 by, e.g., modifying the surface alignment of the PVH layer 800 to provide a rotation of the LC molecules in the x-y plane. The optic axis of the LC molecules may be changed in a linearly repetitive pattern from a center 802 to an edge 804 of the PVH layer 800, with a uniform pitch $\Lambda_x$ along the x-axis. Such a scheme generates a series of slanted and periodical refractive index planes with a slanted angle $\varphi=\pm\arctan(\Lambda_y/\Lambda_x)$, as shown in FIG. 8A. The distance between neighboring slanted lines is the Bragg period $\Lambda_B$ of the Bragg grating formed by the LC molecules in the PVH layer 800. The Bragg period $\Lambda_B$ may depend on the z-axis period $\Lambda_z$ of the LC molecules and the slanted angle $\varphi$ of the Bragg planes with respect to a surface of the PVH layer 800.

Figure 8C:
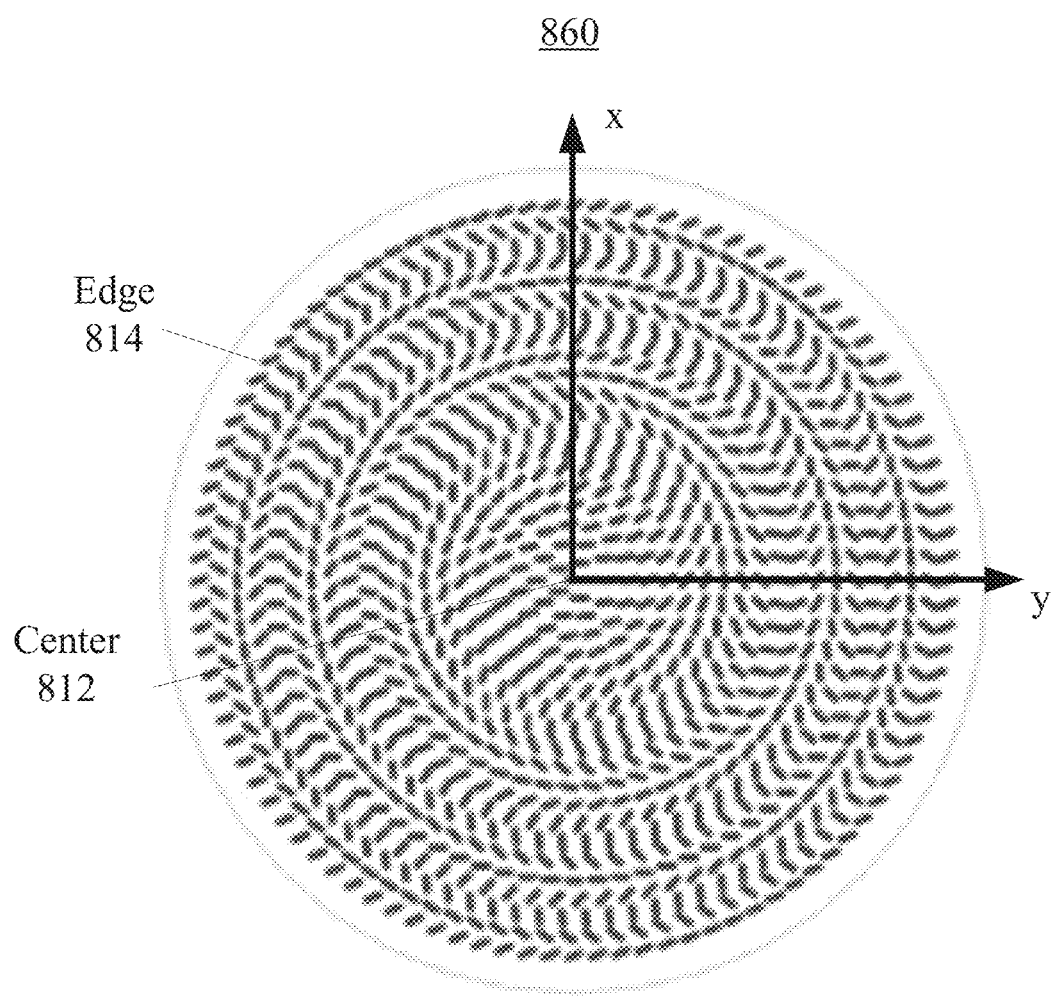
FIG. 8C is another partial plan view of the PVH layer shown in FIG. 8A in the x-y plane, according to an embodiment of the disclosure.

It should be noted that, the partial plan view of the PVH layer 800 in the x-y plane in FIG. 8B is for illustrative purposes and is not intended to limit the scope of the present disclosure. In some embodiments, the LC molecules in the x-y plane may be configured with other orientation to realize a different optical function. FIG. 8C is another partial plan view 860 of the PVH layer shown in FIG. 8A in the x-y plane, according to an embodiment of the disclosure. As shown in FIG. 8C, the PVH layer 800 may create a respective lens profile via the in-plane (x-y plane) orientation (azimuth angle θ) of the LC molecules, in which the phase difference T=2θ. In the PVH layer 800, the azimuth angles of the LC molecules may change continuously from a center 812 to an edge 814 of the PVH layer 800, with a varied period $\Lambda$, i.e., a distance between two LC molecules whose azimuth angles differ from each other by 180°. The lens of the PVH layer 800 may include a certain symmetry in the arrangement of the LC molecules about an optical axis of the PVH layer 800, which, for example, may pass through the center 812 of the PVH layer 800. Depending on the alignment of the LC molecules in the PVH layer 800, the PVH layer 800 may further converge or diverge the incident light in addition to diffracting the incident light.

Figure 9A:
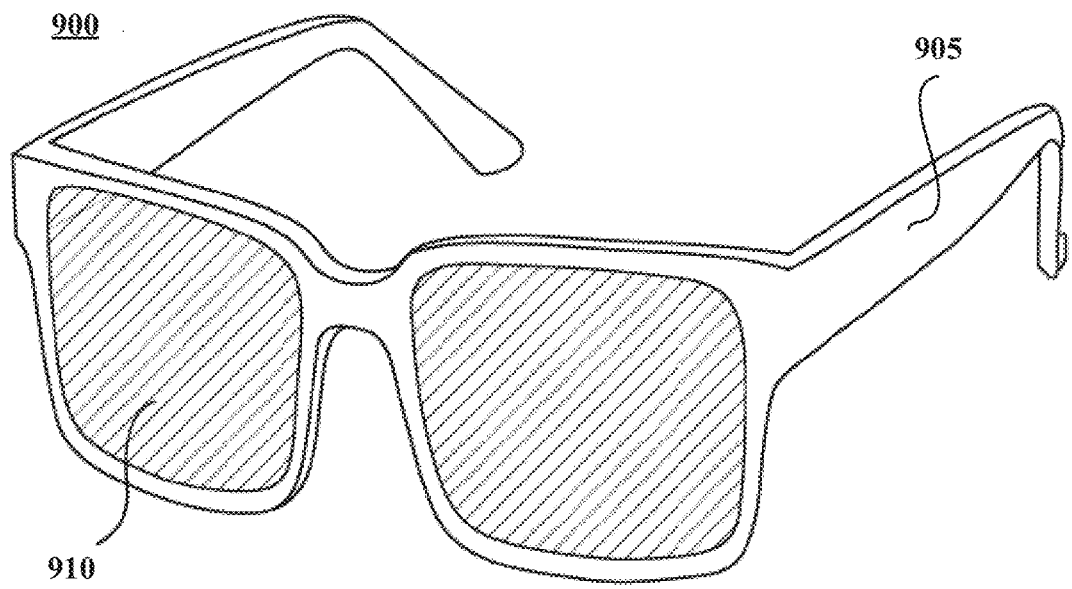
FIG. 9A is a schematic diagram of an HMD, according to an embodiment of the disclosure.

FIG. 9A illustrates a schematic diagram of an HMD 900 according to an embodiment of the disclosure. In some embodiments, the HMD 900 may be referred to as a near-eye display (NED). The HMD 900 may present media to a user. Examples of media presented by the HMD 900 include one or more images, video, audio, or some combination thereof. In some embodiments, audio is presented via an external device (e.g., speakers and/or headphones) that receives audio information from the HMD 900, a console (not shown), or both, and presents audio data based on the audio information. The HMD 900 acts as a virtual reality (VR) device, an augmented reality (AR) device or a mixed reality (MR) device, or some combination thereof. In some embodiments, when the HMD 900 acts as an augmented reality (AR) or a mixed reality (MR) device, portions of the HMD 900 and its internal components may be at least partially transparent.

As shown in FIG. 9A, the HMD 900 may include a frame 905, a display 910, and an eye-tracking system 930 (not drawn in FIG. 9A). Certain device(s) may be omitted, and other devices or components may also be included. The frame 910 may include any appropriate type of mounting structure to ensure the display assembly 920 to be viewed as a near-eye display (NED) by a user. The frame 905 may be coupled to one or more optical elements which together display media to users. In some embodiments, the frame 905 may represent a frame of eye-wear glasses. The display 910 is configured for users to see the content presented by the HMD 900. As discussed below in conjunction with FIG. 9B, the display 910 may include at least one display assembly (not shown) for directing image light to an eye of the user.

Figure 9B:
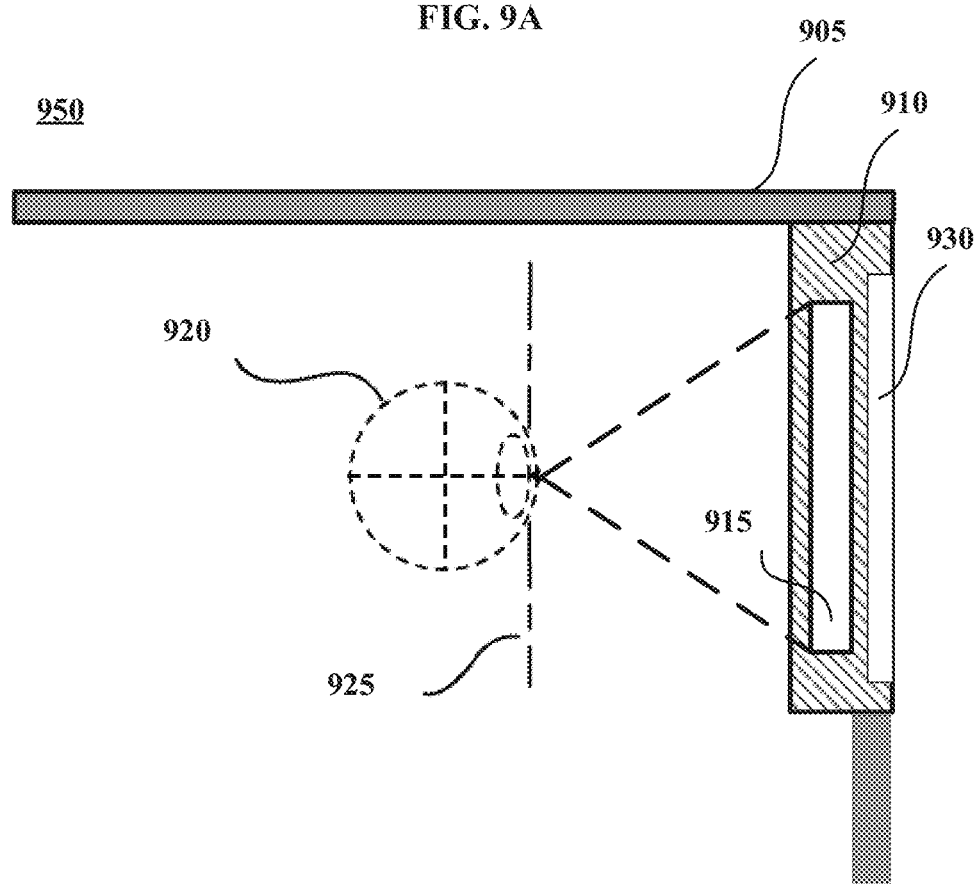
FIG. 9B is a cross sectional view of a front rigid body of the HMD shown in FIG. 9A, according to an embodiment of the disclosure.

FIG. 9B is a cross-section 950 of the HMD 900 shown in FIG. 9A according to an embodiment of the disclosure. The display 910 may include at least one waveguide display assembly 915. An exit pupil 925 may be a location where the eye 920 is positioned in an eye-box region when the user wears the HMD 900. For purposes of illustration, FIG. 9B shows the cross section 950 associated with a single eye 920 and a single waveguide display assembly 915, but in alternative embodiments not shown, another display assembly which is separate from the waveguide display assembly 915 shown in FIG. 9B, may provide image light to an eye-box located at an exit pupil of another eye of the user.

The waveguide display assembly 915, as illustrated below in FIG. 9B, is configured to direct the image light to an eye-box located at the exit pupil 925 of the eye 920. The waveguide display assembly 915 may be composed of one or more materials (e.g., plastic, glass, etc.) with one or more refractive indices that effectively minimize the weight and widen a field of view (FOV) of the HMD 900. In some embodiments, the waveguide display assembly 915 may be a component (e.g., the display 910) of the HMD 900. In some embodiments, the waveguide display assembly 915 may be part of some other NED, or other system that directs display image light to a particular location. As shown in FIG. 9B, the waveguide display assembly 915 may be for one eye 920 of the user. The waveguide display assembly 915 for one eye may be separated or partially separated from the waveguide display assembly 915 for the other eye. In certain embodiments, a single waveguide display assembly 915 may be used for both eyes 920 of the user.

In some embodiments, the HMD 900 may include one or more optical elements between the waveguide display assembly 915 and the eye 920. The optical elements may act to, e.g., correct aberrations in image light emitted from the waveguide display assembly 915, magnify image light emitted from the waveguide display assembly 915, some other optical adjustment of image light emitted from the waveguide display assembly 915, or some combination thereof. The example for optical elements may include an aperture, a Fresnel lens, a convex lens, a concave lens, a filter, or any other suitable optical element that affects image light. In some embodiments, the HMD 900 may include an adaptive dimming device 930, which includes a global or local dimming element. In some embodiments, the dimming element may be electrically or optically tunable. The dimming element may dynamically adjust the transmittance of the see-through view observed through the HMD 900, thereby switching the HMD 900 between a VR device and an AR device or between a VR device and a MR device. In some embodiments, along with switching between the AR/MR device and the VR device, the dimming element may be used in the AR device to mitigate difference in brightness of the see-through view and the virtual image. In some embodiments, the dimming element may dynamically attenuate a light from the real-world environment depending on brightness of the real-world environment, thereby adjusting the brightness of the see-through view.

The eye-tracking system 930 may be any one of the disclosed eye-tracking systems, such as the eye-tracking system 400 or 600 shown in FIG. 4 and FIG. 6, which may include a surface reflection noise reduction mechanism, as described above. With the eye-tracking system 400 or 600, more accurate eye-tracking may be provided by the HMD 900. Information obtained in the accurate eye tracking may be used for determining the type of information to be presented to the user of the HMD 900 and/or the arrangement of the displayed content on a display screen of the HMD 900, addressing vergence/accommodation conflict, and improving display quality and performance of the HMD 900. Accordingly, user experience of the HMD 900 may be enhanced.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a non-transitory computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system, comprising:
    a polarizer;
    a grating structure configured to diffract a first input light as a first output light toward the polarizer; and
    at least one substrate coupled to the grating structure, a surface of the at least one substrate configured to reflect a second input light as a substantially s-polarized light toward the polarizer,
    wherein the first input light and the second input light are incident onto the grating structure and the at least one substrate, respectively, from a side where the polarizer is located, and
    wherein the polarizer is configured to transmit the first output light diffracted by the grating structure and block the substantially s-polarized light reflected by the surface of the at least one substrate.

2. The system of claim 1, further comprising:
    an optical sensor disposed facing the grating structure and configured to receive the first output light that is diffracted by the grating structure and transmitted through the polarizer.

3. The system of claim 1,
    wherein the substantially s-polarized light reflected by the surface of the at least one substrate and the first output light diffracted by the grating structure have different polarizations.

4. The system of claim 1, wherein the grating structure includes a polarization volume hologram ("PVH") layer.

5. The system of claim 4, wherein the grating structure including the PVH layer is configured to diffract a polarized light having a first predetermined handedness, and to transmit a polarized light having second predetermined handedness that is opposite to the first predetermined handedness.

6. The system of claim 5, further comprising a waveplate disposed between the grating structure and the polarizer.

7. The system of claim 6, wherein the waveplate is a quarter-wave plate for an infrared spectrum.

8. An optical system, comprising:
    at least one substrate;
    a grating structure coupled to the at least one substrate, the grating structure configured to diffract a first light having an incidence angle within a predetermined range; and a polarizer configured to transmit the first light diffracted by the grating structure and block a second light reflected by a surface of the at least one substrate, wherein the grating structure is a polarization volume hologram ("PVH") grating, wherein the at least one substrate includes a first substrate and a second substrate arranged opposite to the first substrate, wherein the first substrate and the second substrate are disposed at opposing first and second sides of the PVH grating to sandwich the PVH grating, and a quarter-wave plate disposed between the PVH grating and the first substrate.

9. The system of claim 1, wherein the grating structure is a volume Bragg grating ("VBG").

10. The system of claim 1, wherein the first input light has an incidence angle within a first predetermined range of 0 degree to 35 degrees.

11. The system of claim 1, further comprising a light source configured to emit an infrared light, wherein the first input light and the second input light are both infrared light.

12. An eye-tracking system, comprising:
a light source configured to emit a light to illuminate an eye of a user;
a polarizer;
a grating structure disposed facing the eye and configured to diffract a first input light reflected from the eye as a first output light toward the polarizer; and
at least one substrate coupled to the grating structure, a surface of the at least one substrate configured to reflect a second input light reflected from the eye as a substantially s-polarized light toward the polarizer,
wherein the first input light and the second input light are incident onto the grating structure and the at least one substrate, respectively, from a side where the polarizer is located, and wherein the polarizer is configured to transmit the first output light diffracted by the grating structure, and to block the substantially s-polarized light reflected by the surface of the at least one substrate; and an optical sensor configured to receive the first output light transmitted through the polarizer and generate an image of the eye based on the received first output light.

13. The eye-tracking system of claim 12, wherein the first output light diffracted by the grating structure and the substantially s-polarized light reflected by the surface of the at least one substrate have different polarizations.

14. The eye-tracking system of claim 12, wherein the grating structure includes a polarization volume hologram ("PVH") layer configured to diffract a polarized light having a first predetermined handedness, and to transmit a polarized light having a second predetermined handedness that is opposite to the first predetermined handedness.

15. The eye-tracking system of claim 14, further comprising a quarter-wave plate for an infrared spectrum disposed between the grating structure and the polarizer.

16. The eye-tracking system of claim 12, wherein the grating structure is a volume Bragg grating ("VBG").

17. The system of claim 1, wherein the second input light has an incidence angle within a second predetermined range of 45° to 75° in air.

18. The system of claim 1, wherein the first input light is incident onto the grating structure from air, and the second input light is incident onto the at least one substrate from air.

19. The system of claim 8, wherein the first light is incident onto the grating structure from air, and the second light is incident onto the surface of the at least one substrate from air at an incidence angle in a range of 45° to 75° in air.

* * * * *